(12) United States Patent
Noh et al.

(10) Patent No.: US 8,305,989 B2
(45) Date of Patent: *Nov. 6, 2012

(54) METHOD FOR ALLOCATING PILOTS

(75) Inventors: Min Seok Noh, Anyang-si (KR); Seung Hee Han, Anyang-si (KR); Yeong Hyeon Kwon, Anyang-si (KR); Hyun Woo Lee, Anyang-si (KR); Dong Chul Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/361,629

(22) Filed: Jan. 30, 2012

(65) Prior Publication Data

US 2012/0147770 A1 Jun. 14, 2012

Related U.S. Application Data

(63) Continuation of application No. 12/312,123, filed as application No. PCT/KR2007/005412 on Oct. 31, 2007, now Pat. No. 8,130,711.

(30) Foreign Application Priority Data

Nov. 1, 2006 (KR) .......... 10-2006-0107384
Dec. 22, 2006 (KR) .......... 10-2006-0133177

(51) Int. Cl.
*H04W 4/00* (2009.01)

(52) U.S. Cl. ........ 370/329; 370/208; 370/210; 370/330; 370/335; 370/341; 370/342; 370/343; 370/344; 370/345; 370/347; 455/130; 455/450; 455/451; 455/452.1; 455/452.2

(58) Field of Classification Search .......... 370/329, 370/330, 335, 336, 337, 341, 342, 343, 344, 370/345, 347, 350, 503, 509, 510, 512, 513, 370/514

See application file for complete search history.

(56) References Cited

U.S. PATENT DOCUMENTS

| 5,930,366 | A | 7/1999 | Jamal et al. |
| 6,049,538 | A | 4/2000 | Scott |
| 6,600,934 | B1 | 7/2003 | Yun et al. |
| 6,965,633 | B2 | 11/2005 | Sun et al. |
| 7,403,513 | B2 | 7/2008 | Lee et al. |
| 7,701,919 | B2 * | 4/2010 | Ah Lee .......... 370/344 |
| 2003/0174643 | A1 | 9/2003 | Ro et al. |
| 2003/0215021 | A1 | 11/2003 | Simmonds |
| 2007/0004465 | A1 | 1/2007 | Papasakellariou et al. |
| 2007/0091787 | A1 * | 4/2007 | Kwon et al. .......... 370/208 |
| 2007/0183386 | A1 | 8/2007 | Muharemovic et al. |
| 2008/0049668 | A1 | 2/2008 | Kakura et al. |
| 2008/0123616 | A1 * | 5/2008 | Lee .......... 370/344 |
| 2010/0157937 | A1 * | 6/2010 | Muharemovic et al. .......... 370/330 |

FOREIGN PATENT DOCUMENTS

| EP | 1363434 A2 | 11/2003 |
| KR | 1020020056986 A | 7/2002 |
| KR | 1020030089498 A | 11/2003 |

* cited by examiner

*Primary Examiner* — Olumide T Ajibade Akonai
(74) *Attorney, Agent, or Firm* — McKenna Long & Aldridge LLP

(57) ABSTRACT

This is provided a method for allocating pilots to a sub-frame. The sub-frame includes a plurality of blocks in time domain. The method includes allocating a data demodulation (DM) pilot used for demodulating data to two blocks spaced not contiguous with each other, and allocating a channel quality (CQ) pilot. System capacity can be increased, and degradation of performance incurred by a channel estimation error can be minimized.

14 Claims, 28 Drawing Sheets

METHOD FOR ALLOCATING PILOTS

This application is a continuation of and claims the benefit of U.S. application Ser. No. 12/312,123, filed Apr. 27, 2009, now U.S. Pat. No. 8,130,711 which is a U.S. National Phase entry of International Application No. PCT/KR2007/005412, filed on Oct. 31, 2007, and claims the benefit of Korean Patent Application Nos. 10-2006-0107384 filed on Nov. 1, 2006 and 10-2006-0133177 filed Dec. 22, 2006, all of which are hereby incorporated by reference as if fully set forth herein.

TECHNICAL FIELD

The present invention relates to wireless communication, and more specifically, to a method for allocating pilots to reduce channel estimation errors in a wireless communication system.

BACKGROUND ART

Third generation partnership project (3GPP) mobile communication systems based on a wideband code division multiple access (WCDMA) radio access technique are widely spread all over the world. High speed downlink packet access (HSDPA) that can be defined as a first evolutionary stage of WCDMA provides 3GPP with a wireless access technique that is highly competitive in the mid-term future. However, since requirements and expectations of users and service providers are continuously increased and developments of competing radio access techniques are continuously in progress, new technical evolutions in 3GPP are required to secure competitiveness in the future.

One of the systems being taken into consideration after the third generation is an orthogonal frequency division multiplexing (OFDM) system that can reduce the inter-symbol interference effect with low complexity. The OFDM transforms serially inputted data symbols into N parallel data symbols and transmits the parallel data symbols with loaded on N sub-carriers separated from each other. The sub-carriers maintain orthogonality in terms of frequency. Each of orthogonal channels experiences mutually independent frequency selective fading, and the spaces between transmitted symbols become wider, and thus interference between the symbols can be minimized. Orthogonal frequency division multiple access (OFDMA) is a multiple access method that realizes a multiple-access by independently providing some of available sub-carriers to each user in a system that uses OFDM as a modulation method. The OFDMA provides frequency resources, which are referred to as sub-carriers, to each user, and each of the frequency resources are independently provided to a plurality of users, and thus the frequency resources are generally not overlapped with each other. As a result, the frequency resources are mutual-exclusively allocated to each user.

One of the major problems of the OFDM/OFDMA is that peak amplitude of a transmission signal can be considerably higher than average amplitude. This peak-to-average power ratio (PAPR) problem is originated from the fact that an OFDM signal is the sum of N sinusoidal signals on sub-carriers different from each other. In order to save transmission power, it is needed to lower the PAPR.

One of the systems proposed to lower the PAPR is single carrier-frequency division multiple access (SC-FDMA). SC-FDMA is a type that combines frequency division multiple access (FDMA) with existing single carrier-frequency division equalization (SC-FDE) method. The SC-FDMA has a characteristic similar to that of the OFDMA in that signals are modulated and demodulated in a time domain and a frequency domain using discrete Fourier transform (DFT), but it is advantageous in saving transmission power since the PAPR of a transmission signal is low. Particularly, in connection with usage of a battery, it is advantageous for an uplink that connects a user equipment sensitive to transmission power to a base station.

In order to efficiently restore data at a receiver, channel information should be obtained. The channel information is used for modulating and demodulating the data or scheduling users. Generally, the channel information is obtained based on a pilot contained in a signal transmitted by a transmitter. However, an efficient pilot structure has been not widely known yet.

DISCLOSURE OF INVENTION

Technical Problem

An object of the invention is to provide a method for allocating pilots to increase system capacity.

Technical Solution

In one aspect, there is provided a method for allocating pilots to a sub-frame. The sub-frame includes a plurality of blocks in time domain. The method includes allocating a data demodulation (DM) pilot used for demodulating data to two blocks spaced not contiguous with each other, and allocating a channel quality (CQ) pilot used for measuring channel quality to at least one block.

In another aspect, there is provided a method for allocating pilots to a sub-frame. The sub-frame includes a plurality of blocks in time domain. The method includes allocating a DM pilot used for demodulating data to a first block, and allocating a CQ pilot used for uplink scheduling to a second block, the second block not contiguous with the first block.

Advantageous Effects

System capacity can be increased, and degradation of performance incurred by a channel estimation error can be minimized.

MODE FOR THE INVENTION

Figure 1:
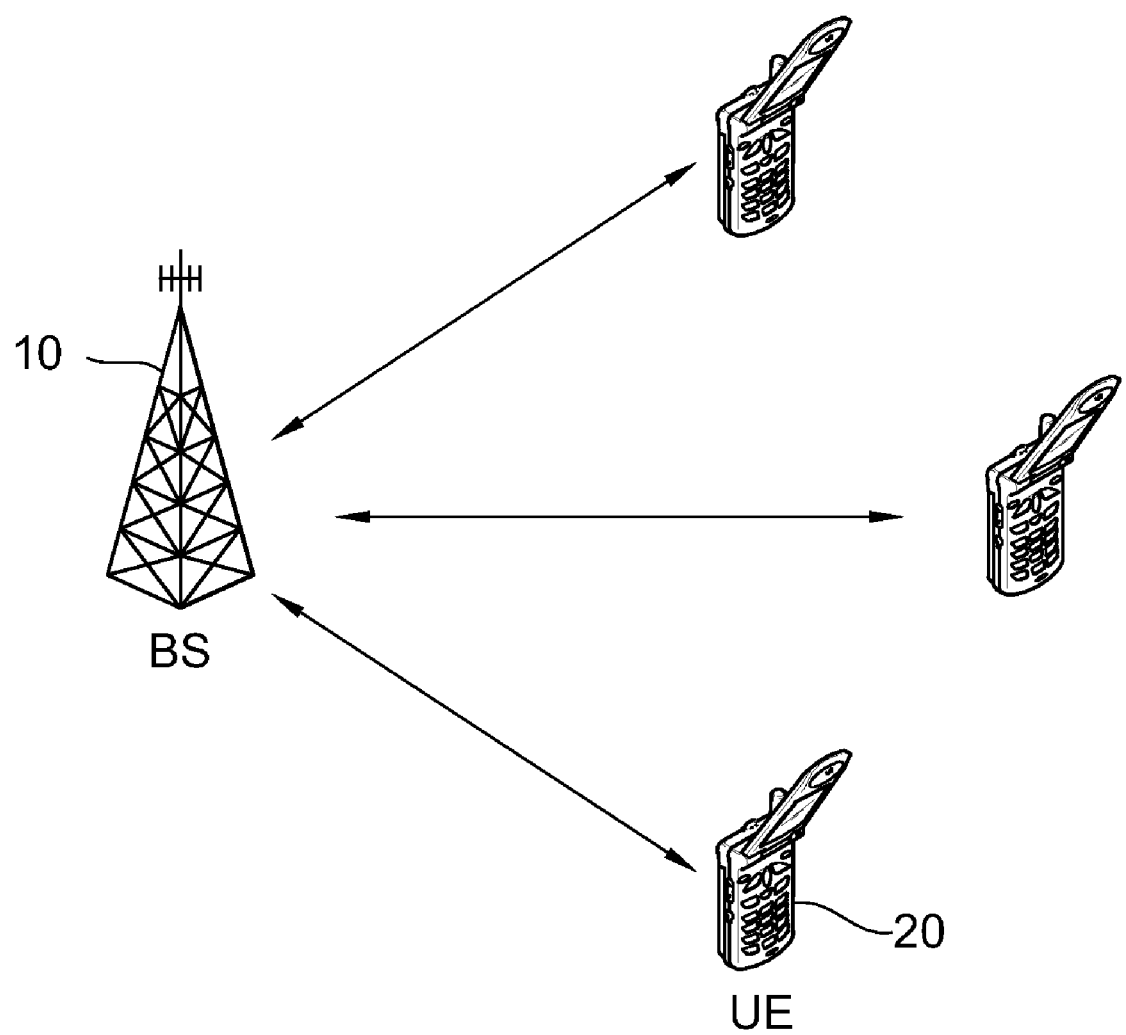
FIG. 1 is an exemplary view showing a mobile communication system.

FIG. 1 is an exemplary view showing a mobile communication system.

Referring to FIG. 1, a mobile communication system comprises a base station and a plurality of user equipments (UEs). This can be a single carrier-frequency division multiple access (SC-FDMA) system. The mobile communication system is widely deployed to provide a variety of communication services such as voices, packet data, or the like.

The base station 10 generally is a fixed station that communicates with the user equipment 20 and can be referred to as another terminology, such as a node-B, base transceiver system (BTS), access point, or the like.

A user equipment 20 can be fixed or mobile and can be referred to as another terminology, such as a mobile station (MS), user terminal (UT), subscriber station (SS), wireless device, or the like.

Hereinafter, downlink means a communication from the base station 10 to the user equipment 20, and uplink means a communication from the user equipment 20 and the base station 10. In the downlink, a transmitter can be a part of the base station 10, and a receiver can be a part of the user equipment 20. In the uplink, a transmitter can be a part of the user equipment 20, and a receiver can be a part of the base station 10. The base station 10 can include a plurality of receivers and transmitters, and the user equipment 20 can include a plurality of receivers and transmitters.

Figure 2:
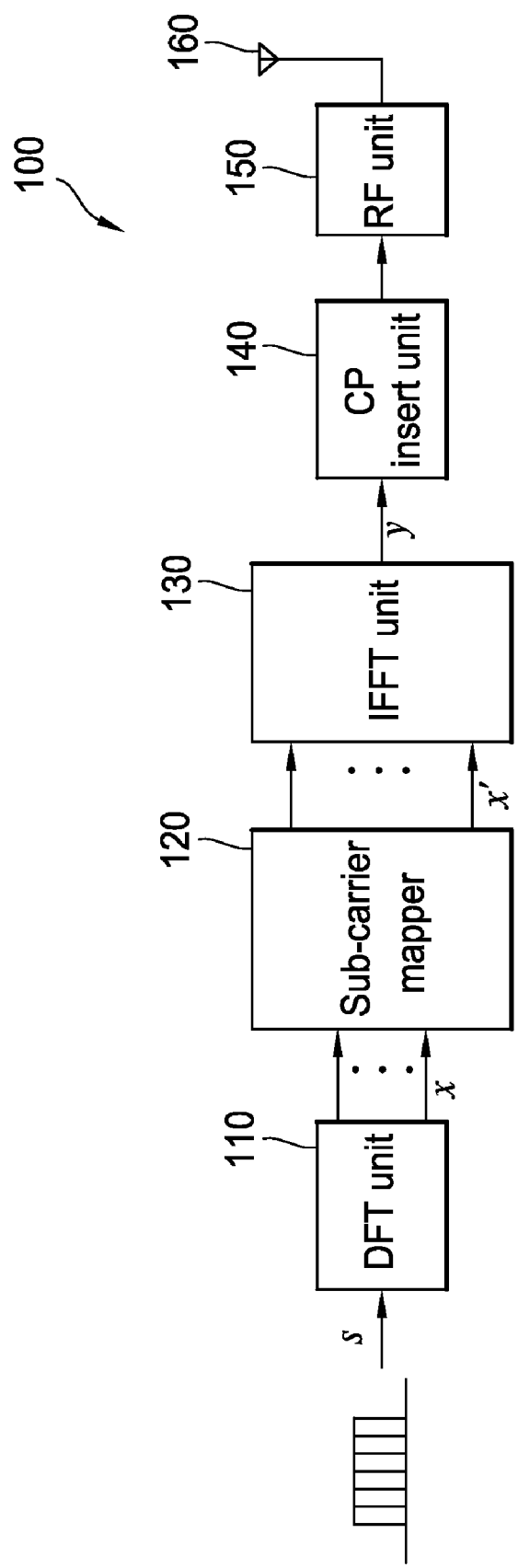
FIG. 2 is a block diagram showing a transmitter according to an embodiment of the present invention.

FIG. 2 is a block diagram showing a transmitter according to an embodiment of the present invention.

Referring to FIG. 2, the transmitter 100 includes a discrete Fourier transform (DFT) unit 110, a sub-carrier mapper 120, an inverse fast Fourier transform (IFFT) unit 130, and a cyclic prefix (CP) insert unit 140.

The DFT unit 110 performs DFT on an input signal s and transforms the input signal into frequency domain signals x. If it is assumed that Nb is the number of sub-carriers for a certain user, the operation of the DFT unit 110 can be expressed as shown $$x = F_{Nb \times Nb} s \quad \text{MathFigure 1}$$

where $F_{Nb \times Nb}$ is a DFT matrix having a size of Nb used for spreading data symbols.

The sub-carrier mapper 120 performs sub-carrier mapping on spreaded frequency domain signals x in a certain sub-carrier allocation method. The IFFT unit 130 performs IFFT on signals x' allocated by the sub-carrier mapper 120 and converts the signals into a time domain signal y. The time domain signal y can be said as an OFDM symbol, which can be expressed as shown The sub-carrier mapper 120 performs sub-carrier mapping on spreaded frequency domain signals x in a certain sub-carrier allocation method. The IFFT unit 130 performs IFFT on signals x' allocated by the sub-carrier mapper 120 and converts the signals into a time domain signal y. The time domain signal y can be said as an OFDM symbol, which can be expressed as shown $$y = F^{-1}_{N \times N} x' \quad \text{MathFigure 2}$$

where $F^{-1}_{N \times N}$ is an IFFT matrix having a size of N, which is used for transforming a frequency domain signal into a time domain signal.

The CP insert unit 140 inserts a CP into the time domain signal y, and the CP-inserted signal is converted into an analog signal by the RF unit 150 and propagated into a radio channel through an antenna 160. The method of generating a transmission signal and transmitting the transmission signal to the receiver by the transmitter is referred to as SC-FDMA. The size of the DFT or IFFT matrix can be varied.

Figure 3:
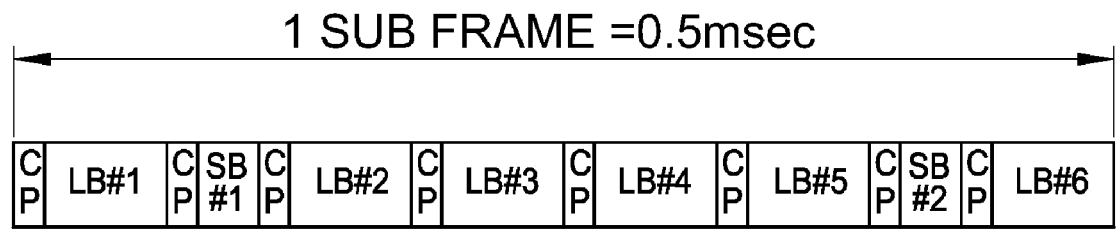
FIG. 3 is an exemplary view showing a sub-frame transmitted by the transmitter.

FIG. 3 is an exemplary view showing a sub-frame transmitted by the transmitter. The length of the sub-frame can be called as a transmission time interval (TTI). Here, the TTI is 0.5 millisecond (ms), but not limited to.

Referring to FIG. 3, a sub-frame contains six long blocks (LB) and two short blocks (SB). The long block LB is a block having a time interval longer than that of the short block SB. Neither the long block LB nor the short block SB has an absolute size. The short block SB includes a first short block SB#1 and a second short block SB#2. Here, the first short block SB#1 precedes the second short block SB#2 in the aspect of time. That is, the first short block SB#1 is transmitted prior to the second short block SB#2.

Although the long block LB is used for control and/or data transmission, it also can be used for transmitting a reference signal. The reference signal is also called as a pilot. If the pilot is contained in the long block LB, the long block LB can be referred to as a pilot block. The short block SB can be used for control and/or data transmission or can be used for transmitting a pilot. If the pilot is contained in the short block SB, the short block SB can be referred to as a pilot block. A cyclic prefix (CP) is inserted in each of the long block LB and the short block SB to minimize interference between symbols and interference occurred by multiple path channel.

The time interval of the short block SB can be shorter than the time interval of the long block LB. The time interval of the short block SB is not limited, but it can be preferably 0.5 times of the time interval of the long block LB. Due to duality of the time domain and frequency domain, the frequency band of the short block SB is twice as wide as the frequency band of the long block LB if the time interval of the short block SB is 0.5 times of the time interval of the long block LB. In addition, the number of sub-carriers of the long block LB is twice as many as the number of sub-carriers of the short block SB. In order to clarify the explanation, hereinafter, it is assumed that the time interval of the short block SB is 0.5 times of the time interval of the long block LB.

Although the time interval of the first short block SB#1 is the same as the time interval of the second short block SB#2, it is not a limitation, but they can have time intervals different from each other. In addition, the time interval of the short block SB can be dynamically modified depending on the time interval of the long block LB or a situation of a system.

A sub-frame contains six long blocks LB and two short blocks SB, but the number of the long blocks and the short blocks contain in the sub-frame is not limited. The sub-frame may contain at least one long block and at least one short block.

Although four long blocks LB are arranged between two short blocks SB in the sub-frame, the arrangement of the short blocks SB and the long blocks is not limited, but can be diversely modified depending on a system. For example, three long blocks LB can be arranged between short blocks SB, or five long blocks LB can be arranged. In addition, arrangement of the short blocks SB can be dynamically modified within the sub-frame depending on performance or environment of a system.

A pilot is data previously known between the transmitter and the receiver and can be classified into two types depending on its usage. One is a channel quality (CQ) pilot for measuring channel quality in order to schedule users and to apply an adaptive modulation and coding (AMC) scheme. The other is a data demodulation (DM) pilot for estimating a channel in order to demodulate data. The CQ pilot is transmitted at a predetermined time in the frequency domain, and the base station grasps the channel state of the user equipment using this information and schedules user equipments in a predetermined scheduling method. Accordingly, for uplink scheduling of the base station, creating a large number of orthogonal channels within a limited time and frequency domain so that a large number of user equipments within a cell may transmit CQ pilots will affect capacity of the system. On the other hand, the DM pilot is a pilot that is transmitted within the time and frequency domain when the user equipment is scheduled and transmits data in the time and frequency domain.

A pilot can be categorized into a CQ pilot and a DM pilot by usage. It is general that the pilot is the DM pilot if the pilot is transmitted within the frequency band of a corresponding user equipment, whereas the pilot is the CQ pilot if the pilot is transmitted throughout a frequency band scheduled wider than the frequency band of the user equipment by the base station. Accordingly, when the pilot is used as the CQ pilot, it can also be used as the DM pilot.

Since there are a plurality of user equipments in a base station or in a sector, each user equipment needs to be discriminated. Particularly, a pilot block should be distinguished between user equipments by using orthogonality.

The orthogonality is divided into a time domain orthogonality, a frequency domain orthogonality, and a code domain orthogonality. The time domain orthogonality has a problem in that an accurate transmission timing control is needed. Accordingly, in an SC-FDNA system, the frequency domain orthogonality or the code domain orthogonality has a further superior characteristic.

The frequency domain orthogonality can be accomplished by transmitting a signal of each of user equipment through a different sub-carrier. Hereinafter, a signal structure using a signal orthogonal in the frequency domain is referred to as frequency division multiplexing (FDM). In the FDM, frequency bands of respective user equipments allocated to a sub-carrier are not overlapped with each other. The frequency domain orthogonality can be applied to a localized signal structure or a distributed signal structure. A localized signal occupies continuous spectrums, and a distributed signal occupies comb-shaped spectrums. Hereinafter, a signal structure using the localized signal is referred to as frequency division multiplexing ? localized (FDM-L), and a signal structure using the distributed signal is referred to as frequency division multiplexing ? distributed (FDM-D).

The code domain orthogonality is accomplished by transmitting a signal of each user equipment through a common sub-carrier. The entire or a portion of a frequency band allocated to a sub-carrier for each user equipment is overlapped. Hereinafter, a signal structure using a signal orthogonal in the code domain is referred to as code division multiplexing (CDM).

Figure 4:
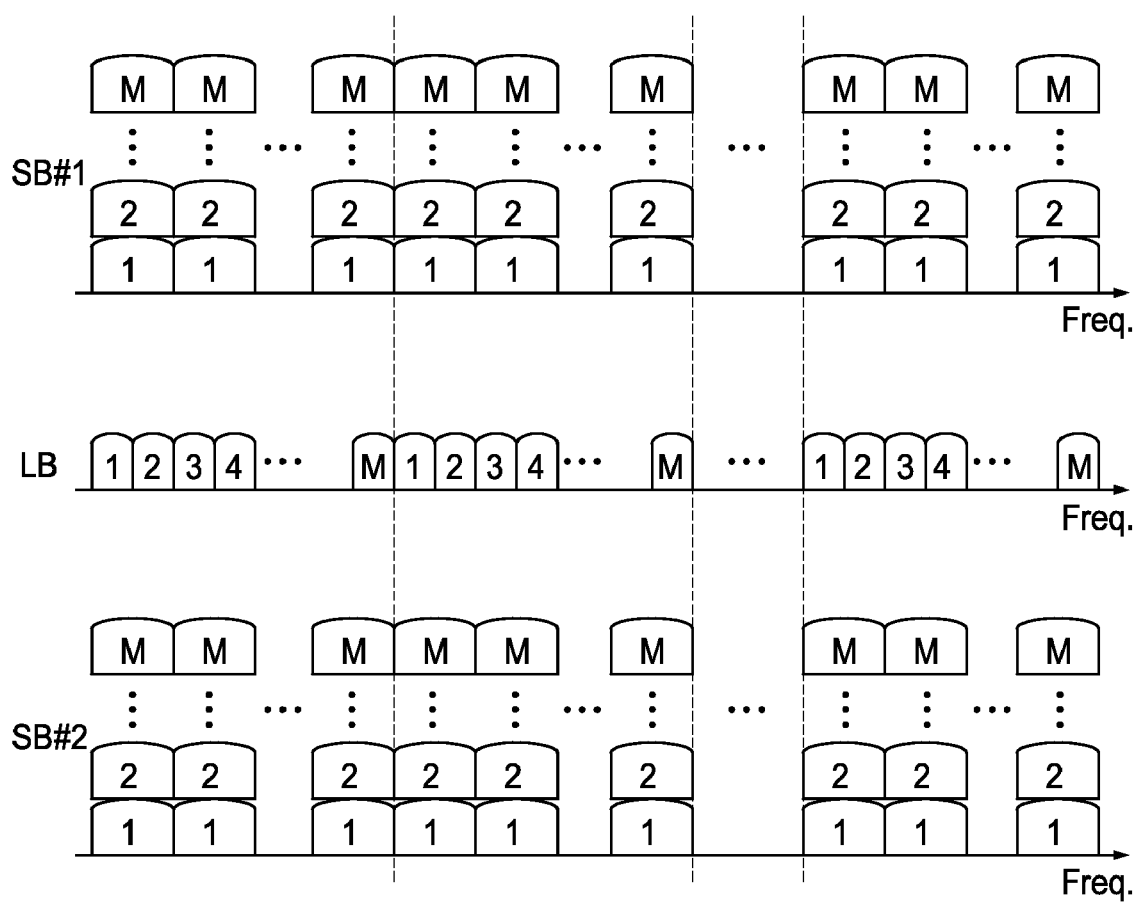
FIG. 4 is an exemplary view showing a signal structure of a CDM method.

FIG. 4 is an exemplary view showing a signal structure of a CDM method.

Referring to FIG. 4, sub-carriers of a pilot signal are transmitted in an overlapped manner for M users (user equipments). The pilot is loaded on the short block SB, and the CDM performs multiplexing among user equipments through the code orthogonality by allocating a code sequence to the entire bands of the short block SB.

Sub-carriers of the short block SB can be allocated throughout the overall frequency band. Here, the overall frequency band is a frequency band including all frequency bands of the user equipments scheduled within a base station or a sector. The short block SB is in the form of overlapped frequency bands of user equipments. The short block SB maintains orthogonality of each user equipment in the code domain.

A constant amplitude zero auto-correlation (CAZAC) sequence can be used as a code sequence. Generally, there are two types of CAZAC sequences, a GCL CAZAC and a Zadoff-Chu CAZAC. The two types of sequences are in a conjugate relation. For example, the Zadoff-Chu CAZAC can be obtained by applying a conjugate to the GCL CAZAC.

In the Zadoff-Chu CAZAC, the k-th entry CAZAC sequence can be expressed as shown $$c(k; N, M) = \exp\left\{\frac{j\pi Mk(k+1)}{N}\right\} \text{ for } N \text{ is odd} \qquad \text{MathFigure 3}$$

$$c(k; N, M) = \exp\left\{\frac{j\pi Mk^2}{N}\right\} \text{ for } N \text{ is even}$$

where M denotes a root index and N denotes the length of a CAZAC sequence. M is a prime relative to N.

The CAZAC sequence c(k;M,N) has three characteristics described below.

$$|c(k; N, M)| = 1 \text{ for all } k, N, M \qquad \text{MathFigure 4}$$

$$R_{M;N}(d) = \begin{cases} 1, & \text{for } d = 0 \\ 0, & \text{for } d \neq 0 \end{cases} \qquad \text{MathFigure 5}$$

$$R_{M_1,M_2;N}(d) = p \text{ for all } M_1, M_2 \qquad \text{MathFigure 6}$$

Equation 4 means that the size of the CAZAC sequence is always one. Equation 5 means that auto correlation of the CAZAC sequence is expressed as a Dirac-delta function. The auto correlation is based on circular correlation. Equation 6 means that the cross correlation is always a constant.

A pilot signal loaded on the short block SB can be used as a DM pilot for demodulating a data signal transmitted on a sub-carrier of a long block of the same band. In addition, since this pilot signal is transmitted throughout the overall frequency band, it can be used as a CQ pilot for measuring channel quality.

Figure 5:
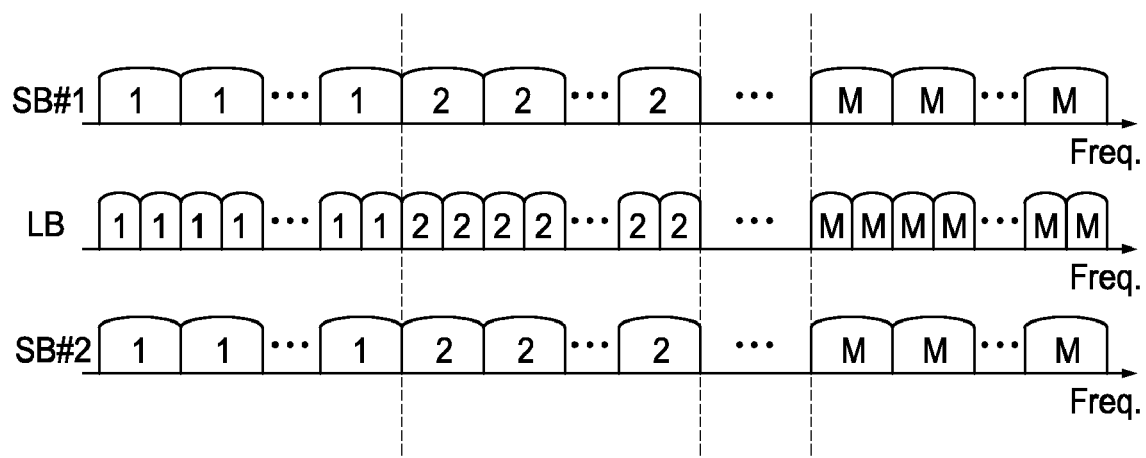
FIG. 5 is an exemplary view showing a signal structure of an FDM-L scheme.

FIG. 5 is an exemplary view showing a signal structure of an FDM-L scheme.

Referring to FIG. 5, sub-carriers are locally concentrated for M users (user equipments). Different user equipments are allocated to different frequency bands, and frequency division multiplexing is used.

Sub-carriers are locally concentrated in the short block SB and the long block LB for each user equipment. A pilot is loaded on the sub-carrier of the short block SB. If the time interval of the short block SB is 0.5 times of the time interval of the long block LB, the sub-carrier of the short block SB occupies a band twice as wide as that of the sub-carrier of the long block LB. Accordingly, two contiguous sub-carriers of the long block LB make a pair with one sub-carrier of the short block SB.

In the FDM-L scheme, a pilot signal loaded on the short block SB can be used as a DM pilot for demodulating a data signal transmitted on the sub-carrier of the long block LB of the same band. It is since that the frequency band of the sub-carrier of the short block SB is overlapped with that of the sub-carrier of the long block LB. However, since the pilot signal is locally concentrated in the frequency domain for a corresponding user equipment, it is difficult to be used as a CQ pilot for measuring channel quality of the overall frequency band.

Figure 6:
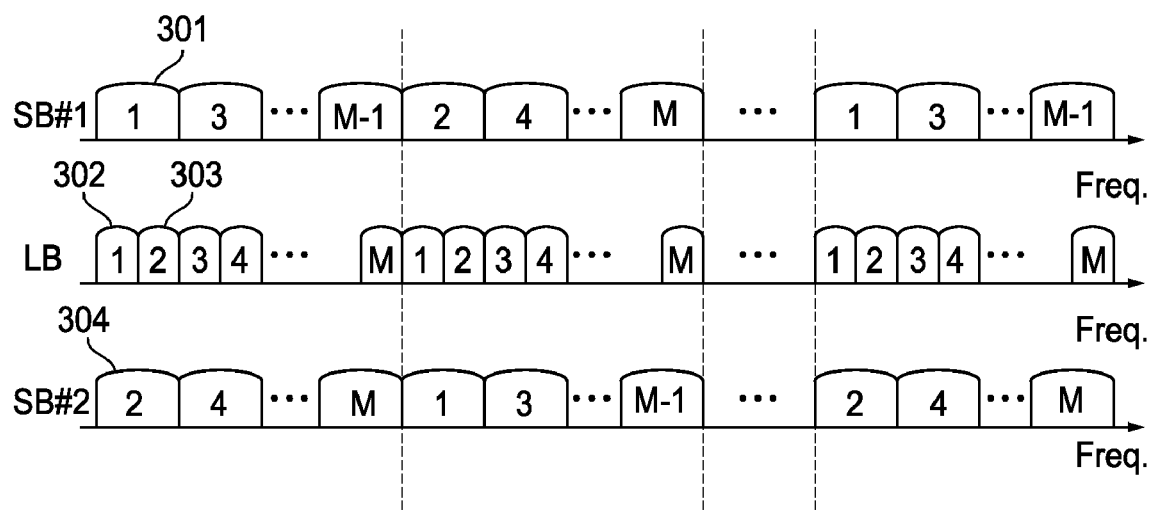
FIG. 6 is an exemplary view showing a signal structure of an FDM-D scheme.

FIG. 6 is an exemplary view showing a signal structure of an FDM-D scheme.

Referring to FIG. 6, sub-carriers are distributed and non-contiguous for M users (user equipments). Sub-carriers of the long block LB and the short block SB are allocated to be distributed at regular intervals so that sub-carriers of the same user equipment are not to be contiguous. That is, sub-carriers of a user equipment are distributed at regular intervals.

Pilot signals allocated to the first short block SB#1 and the second short block SB#2 are allocated in the frequency domain to be staggered from each other for respective user equipments. If the time interval of the short block SB is 0.5 times of the time interval of the long block LB, the sub-carrier of the short block SB occupies a band twice as wide as the band of the a sub-carrier of the long block LB. Since two frequency bands of the long block LB are arranged in one frequency band of the short block SB, in the FDM-D scheme, pilot signals of two short blocks SB are alternatively allocated for each user equipment with respect to the location of a sub-carrier of a user equipment corresponding to the long block LB. For example, a pilot signal for a first user equipment 302 of the long block LB is loaded on the sub-carrier 301 of the first short block SB#1. A pilot signal for a second user equipment 303 of the long block LB in the same band is loaded on the sub-carrier 304 of the second short block SB#2. Thereafter, pilot signals are loaded on the sub-carriers of the short block SB for respective user equipments of the long block LB in a subsequently staggered form.

In the FDM-D scheme, a pilot signal loaded on the short block SB can be used as a DM pilot for demodulating a data signal transmitted on the sub-carrier of the long block LB of the same band. It is since that the frequency band of the sub-carrier of the short band SB is overlapped with the frequency band of the sub-carrier of the long block LB. In addition, since this pilot signal is transmitted throughout the overall frequency band, it can be used as a CQ pilot for measuring channel quality.

In the FDM-D scheme, only a pilot signal of either the first short block SB#1 or the second short block SB#2 can be used at the location of a sub-carrier to which data of the long block LB is allocated. Therefore, an interpolation cannot be performed on the axis of time, and degradation of performance is invited in a time selective channel environment in which moving speed of a user equipment is high.

When a 0.5 ms TTI is assumed, one sub-frame becomes one TTI. However, if the TTI is expanded to 1 ms, it becomes a different matter.

Figure 7:
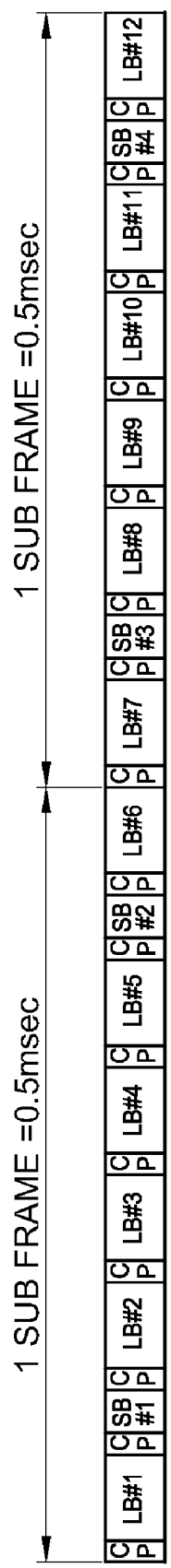
FIG. 7 is an exemplary view showing a sub-frame structure when TTI=1 ms.

FIG. 7 is an exemplary view showing a sub-frame structure when TTI=1 ms.

Referring to FIG. 7, it is a form of repeating the sub-frame of FIG. 3 under the assumption that the same sub-frame is maintained. There are 12 long blocks LB for transmitting data and 4 short blocks SB for transmitting pilots.

One of the problems of the sub-frame structure is that although CQ pilots are allocated to all resources, i.e., all sub-carriers, corresponding to the short block SB, the number of user equipments that can be multiplexed is limited. That is, since the number of sub-carriers allocated to one short block SB is only a half of the number of sub-carriers allocated to one long block LB, the length of a CAZAC sequence is short, and thus the number of cases where circulation is delayed is limited. Furthermore, if DM pilots and CQ pilots are multiplexed within the same short block SB in the FDM scheme, intervals of sub-carriers of the CQ pilot are increased, and thus the number of CAZAC sequences is decreased, which makes cell planning difficult as a result. Due to distribution of power for DM pilots and CQ pilots and decrease of the intervals of sub-carriers on the frequency domain, performance of channel estimation also can be degraded.

In addition, as an example, three short blocks SB out of four short blocks SB can be used as a DM pilot for demodulating data, and the other one short block SB can be used as a CQ pilot for scheduling the frequency domain. At this point, since only one short block SB is used as a CQ pilot, time spacing between short blocks SB that exist between two sub-frames is not uniform, and thus efficiency of channel estimation can be dropped. Furthermore, if CQ pilots are multiplexed among user equipments in the CDM scheme, the number of user equipments that can be multiplexed is limited by a CAZAC sequence.

Hereinafter, a method of allocating pilots according to the present invention will be described.

Figure 8:
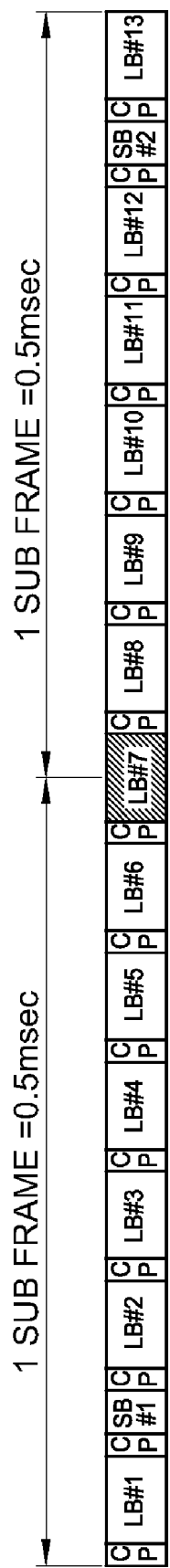
FIG. 8 is an exemplary view showing pilot allocation according to an embodiment of the present invention.

FIG. 8 is an exemplary view showing pilot allocation according to an embodiment of the present invention.

Referring to FIG. 8, the sub-frame contains 13 long blocks LB and 2 short blocks SB. Comparing with the sub-frame of FIG. 7, two short blocks SB are modified to one long block LB.

The two short blocks SB can be used as a DM pilot, and the one long block LB#7 can be used as a CQ pilot. That is, sub-carriers are allocated to the short blocks SB throughout the frequency band of a specific user equipment, and sub-carriers are allocated to the long block LB#7 throughout a frequency band containing the frequency band of a specific user equipment.

Although a long block LB#7 at the center is selected as a long block LB used as a pilot block, a long block LB at another position can be selected. The two short blocks SB can be arranged at positions respectively apart from the long block LB#7, which is used as a pilot block, in the opposite directions. In this case, time spacing between pilots is maintained, and thus efficiency of channel estimation can be enhanced. For example, the two short blocks SB are respectively arranged five long blocks away from the long block LB#7 in the opposite directions. The space between the long block LB#7, i.e., a pilot block, and the short block can be appropriately modified depending on situations.

The short blocks SB can build orthogonality among user equipments in FDM or CDM. The long block LB#7 can build orthogonality among user equipments in CDM. A CAZAV sequence can be used in the short blocks SB and the long block LB#7. At this point, the short blocks SB can build orthogonality among user equipments within a cell in FDM, and can build orthogonality among user equipments in different cells in CDM.

If a user equipment is identified in the CDM scheme since the long block LB#7 twice as wide as the short block SB is used as a CQ pilot, the base station can multiplex twice as many user equipments. It is since that the number of codes of a CAZAC sequence depends on the length of the sequence. Furthermore, it is advantageous in allocating sequences between adjacent cells. In addition, as the length of the sequence becomes longer due to the characteristic of the CAZAC sequence, a cross correlation value becomes smaller, and thus a processing gain also can be obtained accordingly.

The long blocks LB#7 used as a CQ pilot also can be multiplexed among a plurality of user equipments in the CDM or FDM scheme. Since channel quality is measured throughout the overall frequency band, it is possible to know a channel estimation value for a data transmission band used for the long block LB (excluding the long block LB#7 used as a pilot block) to which a sub-carrier transmitted in a localized form is allocated. Accordingly, a pilot contained in the long block LB#7 also can be used as a DM pilot for demodulation.

In the method described above, since two short blocks SB are converted into one long block LB, a length corresponding to one CP allocated to the long block LB remains, and thus the length of the CP needs to be readjusted. In an embodiment, the length of the one remaining CP can be uniformly allocated to all CPs within a 1 ms TTI. Therefore, a delay spread of a channel that is larger than that of an existing structure can be covered. In another embodiment, the one remaining CP is allocated to a pilot block. For example, the CP is allocated to the long block LB#7 or a short block SB to which a CQ pilot is allocated. Therefore, a further larger margin is put in a pilot block to which a pilot is allocated, and thus deviated timing can be further easily updated.

Figure 9:
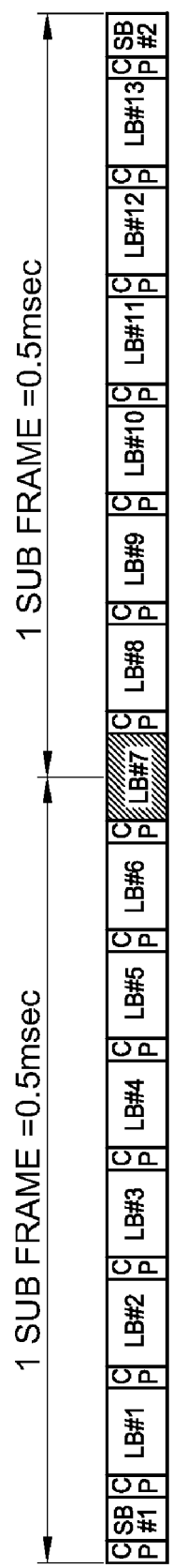
FIG. 9 is an exemplary view showing pilot allocation according to another embodiment of the present invention.

FIG. 9 is an exemplary view showing pilot allocation according to another embodiment of the present invention.

Referring to FIG. 9, in comparison with the sub-frame of FIG. 8, short blocks SB are arranged at both ends. Two short blocks SB are respectively arranged six long blocks away from the long block LB#7 in the opposite directions. The short blocks SB can be used as a DM pilot, and the one ling block LB#7 can be used as a CQ pilot.

Figure 10:
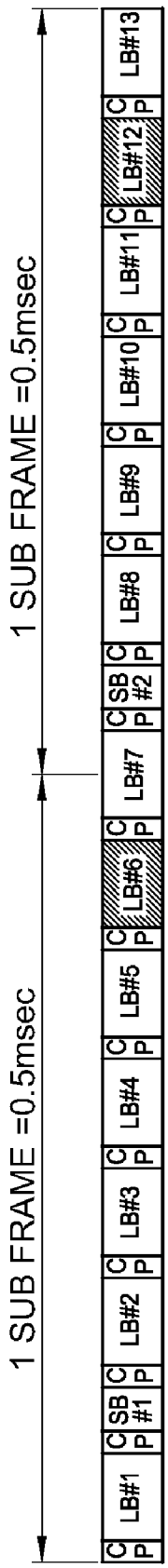
FIG. 10 is an exemplary view showing pilot allocation according to still another embodiment of the present invention.

FIG. 10 is an exemplary view showing pilot allocation according to still another embodiment of the present invention.

Referring to FIG. 10, two short blocks SB and two long blocks LB#6 and LB#12 are used as a pilot within a 1 ms TTI. The short blocks are used as a DM pilot. The long blocks LB#6 and LB#12 are used as a CQ pilot. In addition, since the long blocks LB#6 and LB#12 contain the frequency band of a specific user equipment, they also can be used as a DM pilot, as well as a CQ pilot.

If the long blocks LB#6 and LB#12 twice as wide as the short blocks SB are used as a pilot, and thus user equipments are multiplexed for CQ pilots in the CDM scheme, system capacity can be increased compared with using the short blocks SB. In addition, since two long blocks LB#6 and LB#12 are used as a pilot, accuracy of CQ measurement and/or channel estimation can be enhanced.

Figure 11:
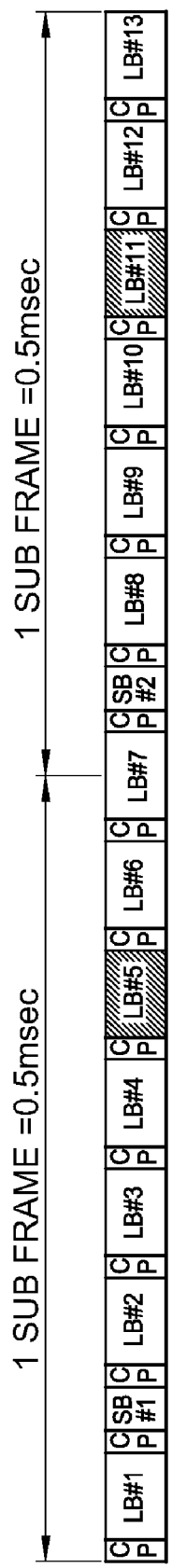
FIG. 11 is an exemplary view showing pilot allocation according to still another embodiment of the present invention.

FIG. 11 is an exemplary view showing pilot allocation according to still another embodiment of the present invention.

Referring to FIG. 11, the positions of long blocks LB#5 and LB#11 on which pilots are loaded are modified from the sub-frame of FIG. 10. The arrangement of two short blocks SB and two long blocks LB#5 and LB#11 is not limited as shown in the figure, but can be diversely modified.

Figure 12:
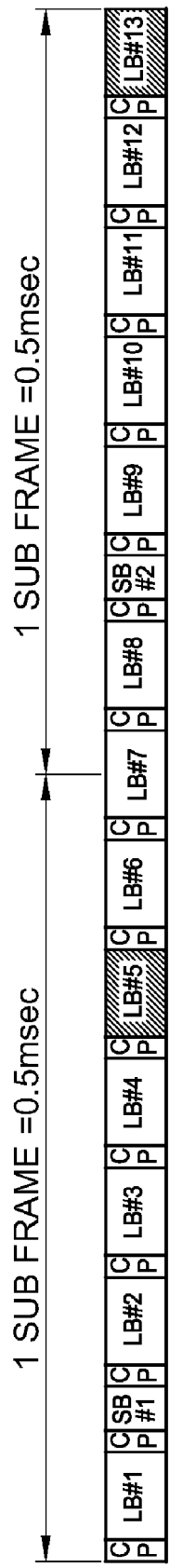
FIG. 12 is an exemplary view showing pilot allocation according to still another embodiment of the present invention.
Figure 13:
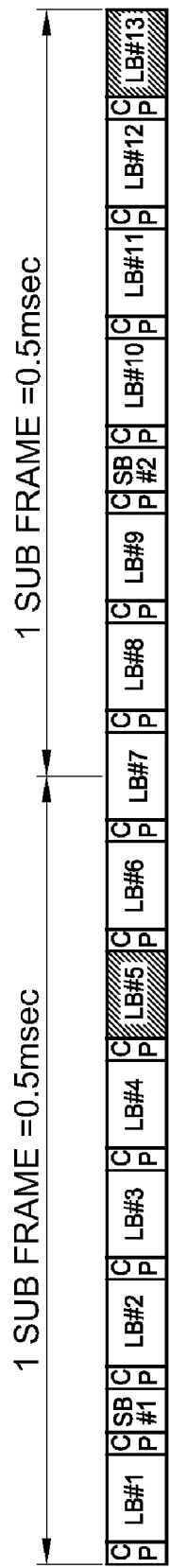
FIGS. 13 to 18 are exemplary views showing pilot allocation according to still another embodiment of the present invention.
Figure 14:
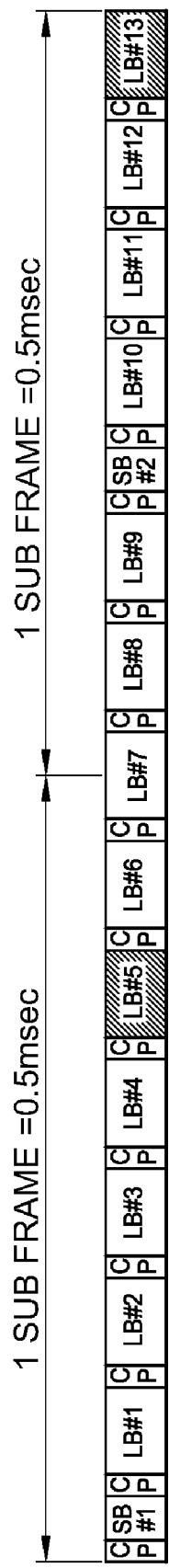
Figure 15:
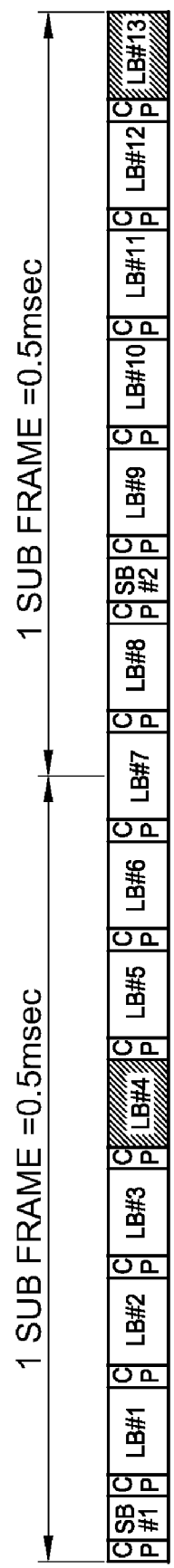
Figure 16:
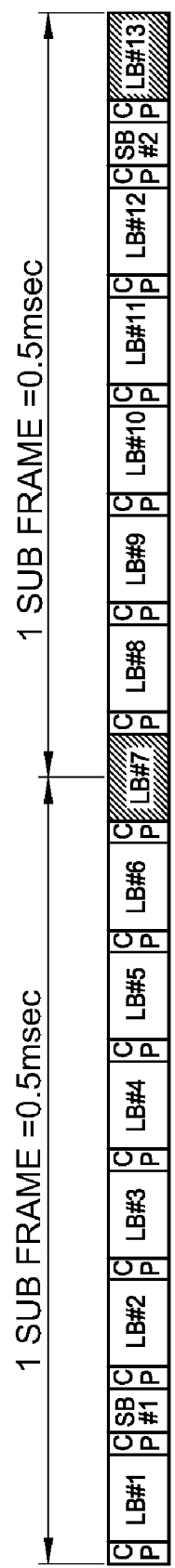
Figure 17:
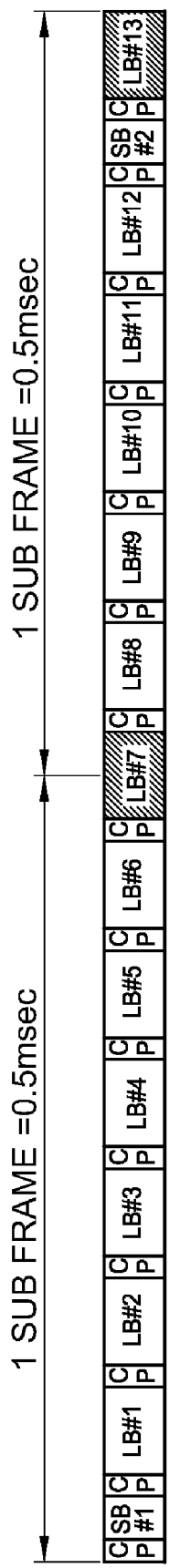
Figure 18:
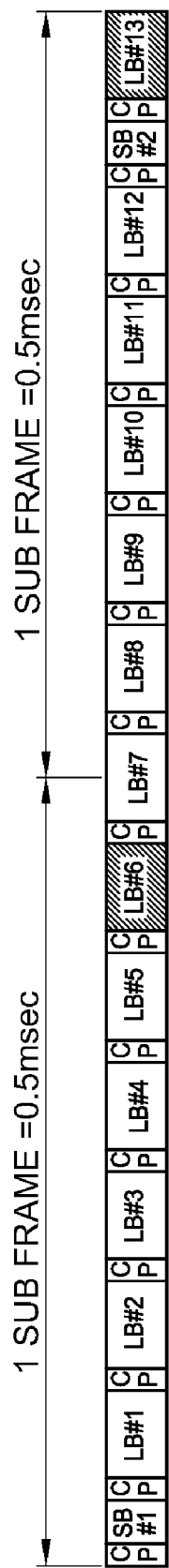

FIG. 12 is an exemplary view showing pilot allocation according to still another embodiment of the present invention.

Referring to FIG. 12, the long block LB#13 positioned at the end of the sub-frame is used as a CQ pilot, and two short blocks SB and one long block LB#5 are used as a DM pilot. This is a case where the long block LB#13 positioned at the end of the sub-frame is used throughout the entire bands. If the CDM scheme is used to identify a user equipment, the long block LB#13 can estimate channels of entire bands, and thus it can be used as a DM pilot, as well as a CQ pilot. Even when the FDM scheme is used to identify a user equipment, the long block LB#13 can estimate channels of entire bands, and thus it can be used as a DM pilot, as well as a CQ pilot.

FIGS. 13 to 18 are exemplary views showing pilot allocation according to still another embodiment of the present invention.

Referring to FIGS. 13 to 18, the long block LB#13 positioned at the end of the sub-frame is used as a CQ pilot, and two short blocks SB and one long block LB#5 are used as a DM pilot. FIGS. 13 to 18 shows sub-frames in which positions of the short blocks and the long block used as a DM pilot are modified. Pilots are allocated while maintaining the time space between the short blocks SB and the long block on which the pilots are loaded so that channel estimation performance can be maintained in accordance with changes in time.

The two short blocks SB and one long block on which DM pilots are loaded are not limited to the forms shown in the figures, but can be diversely modified.

Hereinafter, a method of allocating pilots to a sub-frame configures only with long blocks. That is, one sub-frame is configured with a plurality of blocks having a uniform length.

Figure 19:
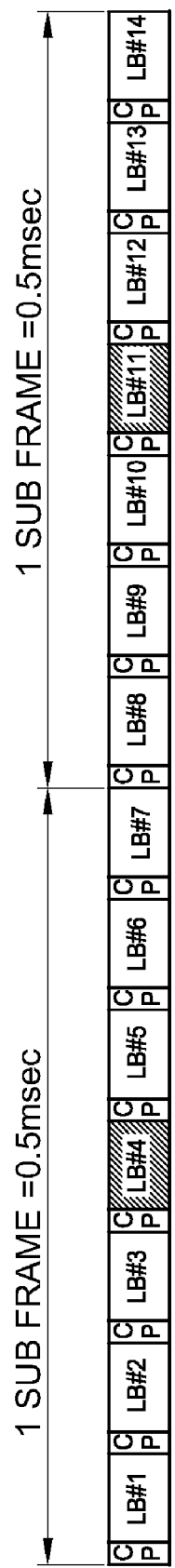
FIG. 19 is an exemplary view showing pilot allocation according to still another embodiment of the present invention.
Figure 20:
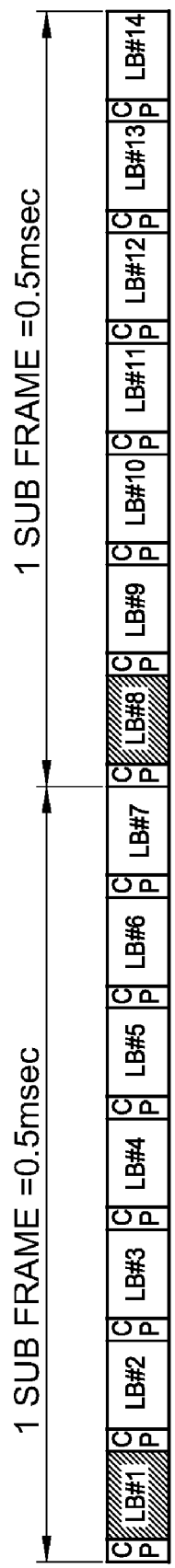
FIGS. 20 to 25 are exemplary views showing pilot allocation according to still another embodiment of the present invention.
Figure 21:
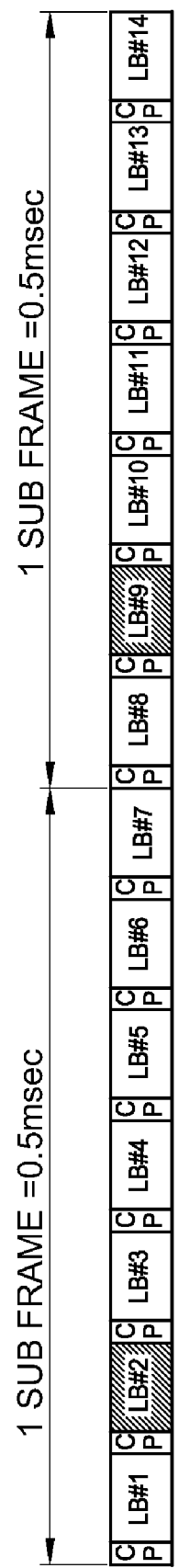
Figure 22:
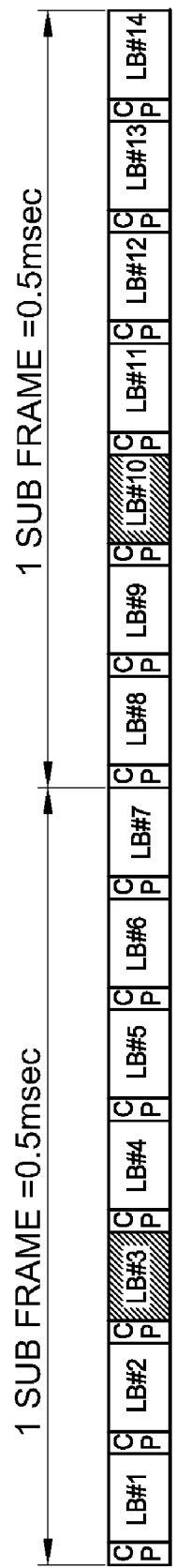
Figure 23:
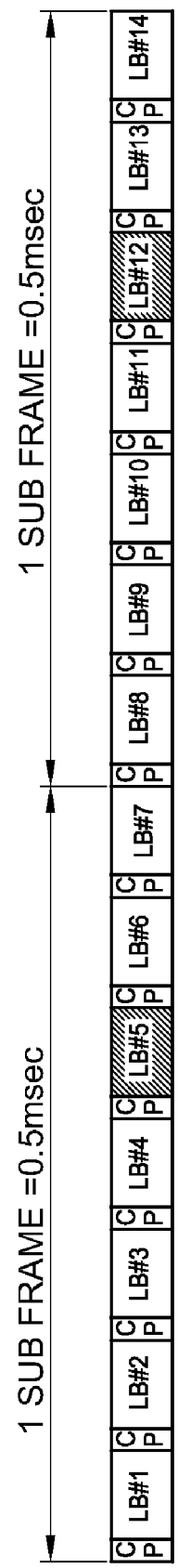
Figure 24:
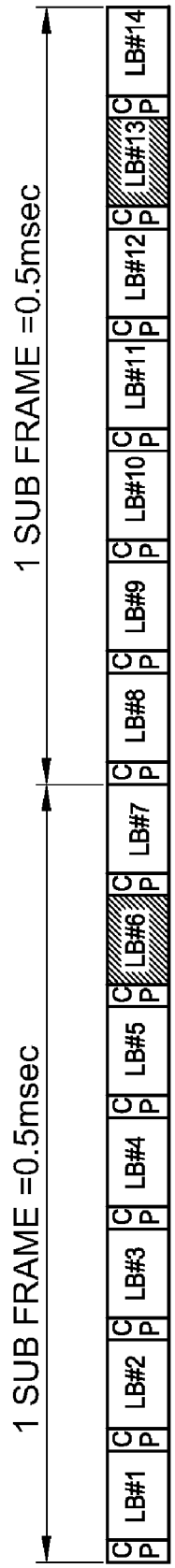
Figure 25:
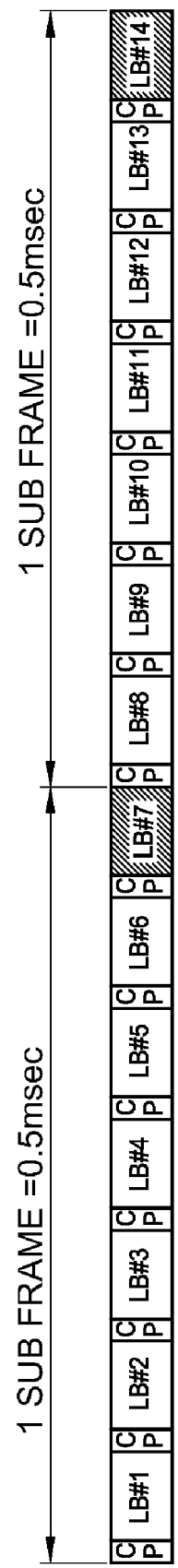

FIG. 19 is an exemplary view showing pilot allocation according to still another embodiment of the present invention.

Referring to FIG. 19, pilots are loaded on two long blocks LB#4 and LB#11, and at least one of the long blocks is used as a CQ pilot. For example, a fourth long block LB#4 is used as a DM pilot, and an eleventh long block LB#11 is used as a CQ pilot. Alternatively, the fourth long block LB#4 is used as a CQ pilot, and the eleventh long block LB#11 is used as a DM pilot. Both of the two long blocks LB#4 and LB#11 can be used as a CQ pilot. It is since that a CQ pilot also can be used as a DM pilot.

The two long blocks LB#4 and LB#11 can be used as a DM pilot, and one of the other long blocks can be used as a CQ pilot. For example, the fourth long block LB#4 and the eleventh long block LB#11 can be used as a DM pilot, and a first long block LB#1 can be used as a CQ pilot. Alternatively, the fourth long block LB#4 and the eleventh long block LB#11 can be used as a DM pilot, and a fourteenth long block LB#14 can be used as a CQ pilot. At this point, the interval of CQ pilots is equal to or longer than the interval of DM pilots. For example, CQ pilots can be allocated to long blocks at intervals of 1 TTI or longer than 1 TTI.

If only long blocks LB#4 and LB#11 are used as pilot blocks, and the CDM scheme is used, the number of codes of a CAZAC sequence can be increased, and thus system capacity is increased. In addition, the number of long blocks is increased by converting two short blocks into one long block, and thus a data rate can be increased.

FIGS. 20 to 25 are exemplary views showing pilot allocation according to still another embodiment of the present invention.

Referring to FIGS. 20 to 25, various arrangements of two long blocks on which pilots are loaded are shown. Pilots are allocated while maintaining the time space between long blocks on which the pilots are loaded so that channel estimation performance can be maintained in accordance with changes in time.

The long blocks on which pilots are loaded are not limited to the forms shown in the figures, but can be diversely modified. In addition, the number of long blocks on which pilots are loaded is not limited to two, but pilots can be loaded on one or more long blocks.

Figure 26:
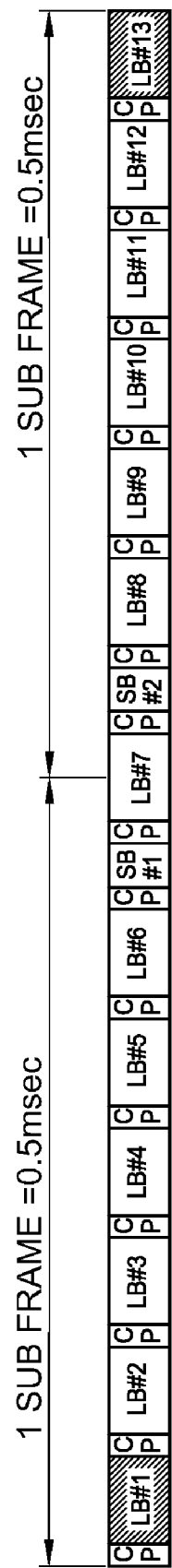
FIG. 26 is an exemplary view showing pilot allocation according to still another embodiment of the present invention.

FIG. 26 is an exemplary view showing pilot allocation according to still another embodiment of the present invention.

Referring to FIG. 26, pilots are loaded on two long blocks LB#1 and LB#13 and two short blocks SB#1 and SB#2. Pilots are loaded on the long blocks LB#1 and LB#13 positioned at both ends of 1 ms TTI.

The pilots of the long blocks LB#1 and LB#13 can be used as a DM pilot, and since pilots of the short blocks SB#1 and SB#2 are allocated within a scheduling bandwidth containing the frequency band of a specific user equipment or for the entire bands, they can be used both as a CQ pilot and as a DM pilot. Since the long blocks LB#1 and LB#13 twice as wide as the short blocks SB#1 and SB#2 are used as a DM pilot, accuracy of channel estimation can be enhanced on the axis of frequency.

Figure 27:
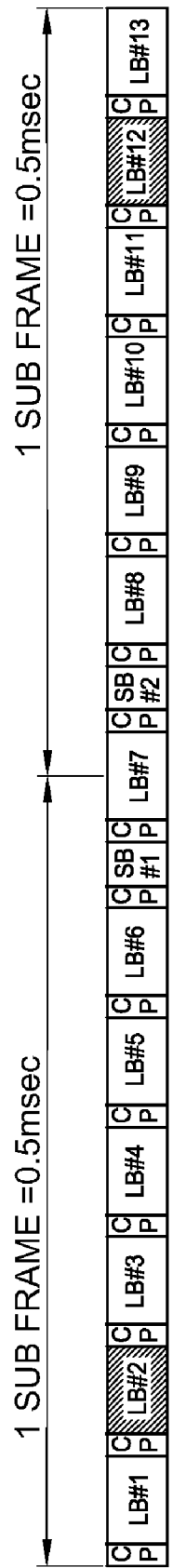
FIG. 27 is an exemplary view showing pilot allocation according to still another embodiment of the present invention.

FIG. 27 is an exemplary view showing pilot allocation according to still another embodiment of the present invention.

Referring to FIG. 27, pilots are loaded on two long blocks LB#2 and LB#12 and two short blocks SB#1 and SB#2. Compared with the embodiment of FIG. 26, pilots are loaded on the long blocks LB#2 and LB#12 respectively positioned at one long block inside from both ends of 1 ms TTI. Pilots of the long blocks LB#2 and LB#12 can be used as a DM pilot, and since pilots of the short blocks SB#1 and SB#2 are allocated within a scheduling bandwidth containing the frequency band of a specific user equipment or for the entire bands, they can be used both as a CQ pilot and as a DM pilot.

Figure 28:
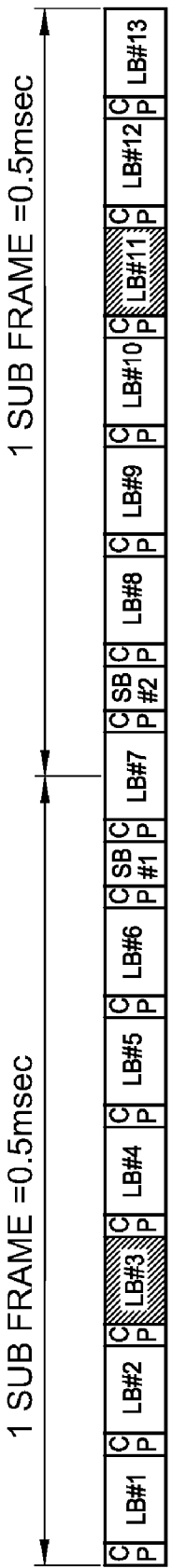
FIG. 28 is an exemplary view showing pilot allocation according to still another embodiment of the present invention.

FIG. 28 is an exemplary view showing pilot allocation according to still another embodiment of the present invention.

Referring to FIG. 28, pilots are loaded on two long blocks LB#3 and LB#11 and two short blocks SB#1 and SB#2. Pilots of the long blocks LB#3 and LB#11 can be used as a DM pilot, and since pilots of the short blocks SB#1 and SB#2 are allocated within a scheduling bandwidth containing the frequency band of a specific user equipment or for the entire bands, they can be used both as a CQ pilot and as a DM pilot.

The steps of a method described in connection with the embodiments disclosed herein may be implemented by hardware, software or a combination thereof. The hardware may be implemented by an application specific integrated circuit (ASIC) that is designed to perform the above function, a digital signal processing (DSP), a programmable logic device (PLD), a field programmable gate array (FPGA), a processor, a controller, a microprocessor, the other electronic unit, or a combination thereof. A module for performing the above function may implement the software. The software may be stored in a memory unit and executed by a processor. The memory unit or the processor may employ a variety of means that is well known to those skilled in the art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The invention claimed is:

1. In a wireless communication network, a method for transmitting pilots in a sub-frame, the sub-frame including a plurality of symbols, the method performed by a user equipment (UE) and comprising:

transmitting a first pilot signal to a base station (BS), wherein the first pilot signal is used for demodulating a signal transmitted by a first symbol and a second symbol of the sub-frame, wherein a first resource transmitting the first pilot signal of the first symbol is different from a second resource transmitting the first pilot signal of the second symbol, and transmitting a second pilot signal different from the first pilot signal to the BS, wherein the second pilot signal is used for measuring channel quality associated with at least one symbol of the sub-frame, wherein the second pilot signal measuring the channel quality is transmitted in a last symbol of the sub-frame, wherein the first resource includes a first frequency band at which the first pilot signal of the first symbol is transmitted, and the second resource includes a second frequency band at which the first pilot signal of the second symbol is transmitted.

2. The method of claim 1, wherein a bandwidth of the first frequency band is identical to a bandwidth of the second frequency band.

3. The method of claim 1, wherein a symbol transmitting the second pilot signal is not contiguous to a symbol transmitting the first pilot signal.

4. The method of claim 1, wherein the first pilot signal and the second pilot signal are distinguishable by an orthogonal code sequence.

5. The method of claim 4, wherein the orthogonal code sequence is a Zadoff-Chu sequence.

6. The method of claim 1, wherein a number of symbols in the sub-frame is 14.

7. The method of claim 1, wherein the first pilot signal and the second pilot signal are transmitted via a number of orthogonal frequency division multiplexing (OFDM) symbols.

8. In a wireless communication network, an user equipment (UE) comprising:

a transmitter configured for transmitting pilots in a sub-frame, the sub-frame including a plurality of symbols, the transmitter being further configured for:

transmitting a first pilot signal which is used for demodulating a signal transmitted by a first symbol and a second symbol of the sub-frame, wherein a first resource transmitting the first pilot signal of the first symbol is different from a second resource transmitting the first pilot signal of the second symbol, and transmitting a second pilot signal different from the first pilot signal, wherein the second pilot signal is used for measuring channel quality associated with at least one symbol of the sub-frame, wherein the second pilot signal measuring the channel quality is transmitted in a last symbol of the sub-frame, wherein the first resource includes a first frequency band at which the first pilot signal of the first symbol is transmitted, and the second resource includes a second frequency band at which the first pilot signal of the second symbol is transmitted.

9. The user equipment of claim 8, wherein a bandwidth of the first frequency band is identical to a bandwidth of the second frequency band.

10. The user equipment of claim 8, wherein a symbol transmitting the second pilot signal is not contiguous to a symbol transmitting the first pilot signal.

11. The user equipment of claim 8, wherein the first pilot signal and the second pilot signal are distinguishable by an orthogonal code sequence.

12. The user equipment of claim 11, wherein the orthogonal code sequence is a Zadoff-Chu sequence.

13. The user equipment of claim 8, wherein a number of symbols in the sub-frame is 14.

14. The user equipment of claim 8, wherein the first pilot signal and the second pilot signal are transmitted via a number of orthogonal frequency division multiplexing (OFDM) symbols.

* * * * *